Jan. 22, 1946.   R. J. SCHROEDER   2,393,343
AUXILIARY RELIEF VALVE FOR PRESSURE CABINS
Filed Aug. 8, 1944   2 Sheets-Sheet 1

INVENTOR
ROBERT J. SCHROEDER
BY
ATTORNEYS

Jan. 22, 1946.  R. J. SCHROEDER  2,393,343
AUXILIARY RELIEF VALVE FOR PRESSURE CABINS
Filed Aug. 8, 1944   2 Sheets-Sheet 2
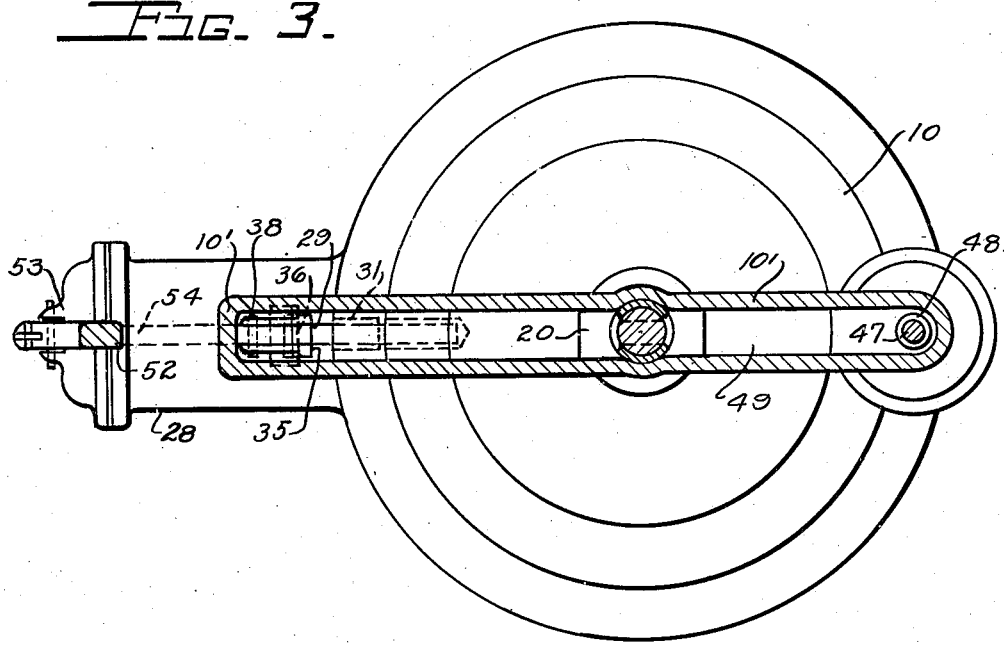
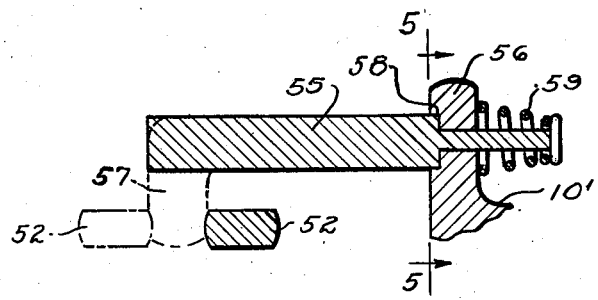
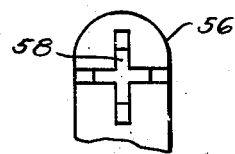
INVENTOR.
ROBERT J. SCHROEDER Patented Jan. 22, 1946

2,393,343

UNITED STATES PATENT OFFICE 2,393,343

AUXILIARY RELIEF VALVE FOR PRESSURE CABINS

Robert J. Schroeder, New Bremen, Ohio

Application August 8, 1944, Serial No. 548,589

14 Claims. (Cl. 98—1.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a novel auxiliary relief valve for pressurized cabins, being used in addition to the usual pressure control valve.

In aviation, it is known that people may readily travel in airplanes up to certain altitudes having an atmospheric pressure which persons can safely endure, usually up to an elevation of 8,000 feet, at which elevation the sea level pressure of 30 inches of mercury has decreased to a pressure of about 22 inches of mercury. However, in ascending therefrom to higher altitudes, in order to avoid harmful physiological effects to the occupants of the airplane cabin, it is necessary to have mechanism provided for supplying supercharged air to the cabin, to maintain the cabin pressure above the pressure of the surrounding air or ambient atmosphere.

Control valve means has heretofore also been provided for maintaining the proper pressure in the cabin, as disclosed, for example, in the patent to Price, No. 2,208,554. It is endeavored thereby to maintain the internal cabin pressure substantially constant, corresponding to that of the selected altitude, or to permit a minor pressure drop therefrom, until a selected pressure differential between cabin pressure and ambient atmospheric pressure is reached, such as a pressure differential ranging from 13 to 15 inches of mercury, and thereafter to maintain such pressure differential.

A relief valve has heretofore been utilized in such a pressurized cabin to relieve excess pressure therefrom, in event of malfunctioning of the control valve; but this has been a slow acting spring-pressed valve arranged and adapted only to relieve air pressure slowly from the cabin to the ambient atmosphere when such cabin pressure becomes excessive.

It is one of the essential objects of this invention to provide a quick-acting auxiliary relief valve to be used in addition to the customary control valve which is already utilized in such a pressure cabin, and by which auxiliary relief valve the excessive differential of pressure in the cabin over the external atmospheric pressure will be automatically and instantaneously relieved when it has reached a critical differential pressure.

Another object of this invention is to provide a relief valve which will function promptly when the differential pressure between a pressurized airplane cabin and the ambient atmosphere exceeds a predetermined limit, such as 15 inches of mercury; and which is an automatically and instantaneously opening valve of sufficient capacity to quickly relieve the surplus or maximum amount of air which may continue to be introduced by the supercharger into the cabin, whereby to prevent pressure build-up in the cabin above the initial valve opening differential pressure and thereby protect the cabin structure from excessive internal pressure, in the event of failure of the pressure regulator mechanism and the like.

A further object of this invention is to provide such a valve for instantaneously relieving excessive internal cabin pressure to the atmosphere, and which valve is furthermore also arranged for promptly admitting external air pressure into the cabin whenever the external pressure exceeds the cabin pressure, as when the airplane suddenly descends or the like.

Another object of this invention is to provide a relief valve which is operated entirely automatically; and which is furthermore equipped with a manual over-ride control so that it can be operated also by hand to instantaneously close the valve whenever desired.

It is another object of this invention to provide a unitary structure which is compact and rugged adapted to be readily installed in the airplane cabin, and which will serve its purpose efficiently for an extended length of time.

In the drawings:

Fig. 3 is a cross-sectional view of the valve, taken on line 3—3 of Fig. 1.

Fig. 4 is an enlarged sectional view of the lever-locking arm, taken on line 4—4 of Fig. 1.

Fig. 5 is a sectional detail view, taken on line 5—5 of Fig. 4.

Figure 1:
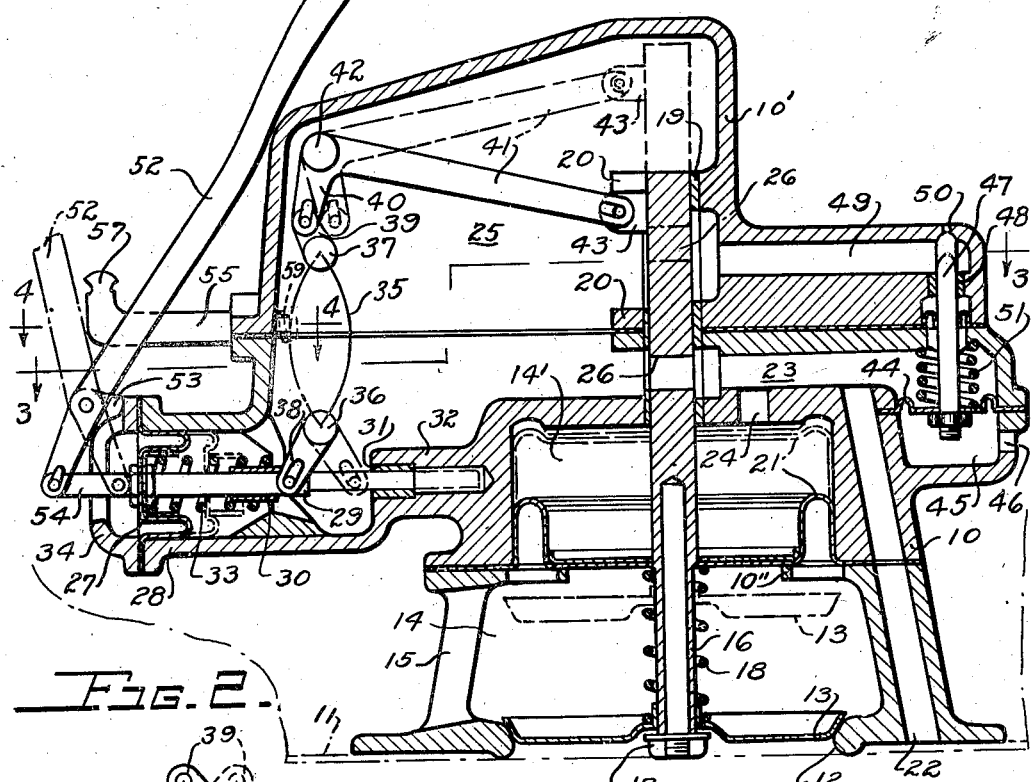
Fig. 1 is a central sectional view of my auxiliary relief valve, illustrated in its preferred form of construction.

Briefly, the pressure relief valve which forms the subject matter of this invention finds its greatest utility in a pressurized airplane cabin which has heretofore been equipped with means for supercharging the air in the cabin and with valve means for controlling the pressure of the air therein; and this relief valve is arranged to be installed and to serve as an additional safety means which will act automatically and instantaneously by promptly relieving excessive cabin pressure, that may be suddenly occasioned, as when the pressure regulator fails and the like, and which pressure would otherwise cause considerable injury. The valve is furthermore constructed so that it will open automatically and instantaneously when the external atmospheric pressure exceeds the cabin pressure, to admit the external air into the cabin.

This valve mechanism, as disclosed herein, consists of a unitary structure which comprises a casing 10 having a rounded lower portion and including a narrow upper portion 10', said casing being mounted inside an aircraft cabin 11, with the valve seat 12 arranged in the form of a mounting portion or base placed in the wall part of the pressurized cabin and the valve 13 which rests in said seat placed subject to ambient atmospheric pressure, as to the unpressurized bomb bay.

The casing 10 contains a compartment 14 in its lower portion having a large port 15 which provides continuous communication between the compartment and the interior of the cabin 11.

A stem 16 carries the valve 13 loosely thereon, resting upon a shoulder 17 on the lower end of the stem, and being slidable upwardly on the lower part of the latter, against the action of a compression spring 18 surrounding the stem. Said stem extends upwardly in the casing and is movably mounted in a bearing sleeve 19 which is supported in bracket means 20 provided in the casing. The stem is adapted to slide longitudinally in the sleeve 19 for operating the valve.

A diaphragm 21 is mounted across compartment 14 thereby separating the main lower part of this compartment from its upper part 14'. The spring 18 on the stem is held under compression between valve 13 and diaphragm 21, adapted to urge the valve to its closed position.

A channel or passage 22 is provided in the casing wall, being open to ambient atmospheric pressure at its outer end located in said valve seat portion and extending upwardly to a channel 23 in the intermediate part of the casing in the narrowed upper part 10'. Said channel 23 communicates through a port 24 with the upper compartment 14' above diaphragm 21, to admit the ambient atmospheric pressure through channels 22 and 23 and port 24 to the upper side of said diaphragm.

This assembly of the valve 13 on its stem 16 with the spring 18 and the diaphragm 21 thus provides a balanced valve assembly, wherein, normally under valve-closed conditions the air pressure in the cabin is exerted downwardly on valve 13 and upwardly on diaphragm 21 while the ambient atmospheric pressure is exerted upwardly on valve 13 and downwardly on diaphragm 21, whereby this assembly is lifted as a unit by the upward movement of the stem.

A chamber 25 is provided within the casing 10, being mainly in the upper part 10' thereof; and a port 26 extends through stem 16, and in its valve-closed position this port 26 communicates with the channel 23 and admits the ambient atmosphere or external air through channels 22 and 23 and port 26 to chamber 25, so that in this normal valve-closed position said chamber is under ambient atmospheric pressure.

When ambient atmospheric pressure exceeds cabin pressure, as when the airplane suddenly descends to lower altitudes and denser atmospheric pressure, this valve 13 will be promptly forced upward on the stem 16, toward diaphragm 21, which is prevented from descending in view of its supporting means 10'', thereby compressing spring 18, and will be automatically opened by such external pressure to admit the ambient atmosphere through compartment 14 and through port 15 into the cabin.

Means is provided with this invention for automatically opening the valve when the pressure within the cabin rises to an excessive degree, or beyond a selected pressure differential of about 13 inches of mercury to 15 inches of mercury, over the ambient atmospheric pressure. This means, as illustrated herein, comprises a diaphragm 27 mounted across the open end of a neck 28 which extends from the casing 10 and is open to the chamber 25, so that this diaphragm is normally, at its outward side under the influence of cabin pressure, and at its inward side under the influence of ambient atmospheric pressure contained in chamber 25. The diaphragm 27 is adjustably secured between suitable elements adjustably mounted on a shaft 29 which is supported in a bearing 30 provided in the neck and in a bearing 31 provided in a shoulder 32 in the casing. A spring 33, adjustable for tension in neck 28, urges diaphragm 27 to its outer position; and a cap 34 is mounted on the outer end of the neck, over the rim portion of the diaphragm.

The diaphragm 27 and its shaft 29 are operatively connected with valve stem 16 for actuating it and the valve 13, and the connecting means interposed between said shaft and stem include a quick acting member 35, such as a spring having a snap action, preferably an arced cantilever spring, mounted at its two ends in a pair of supporting pins 36 and 37 pivotally supported in the upper part 10' of the casing. The pivot 36 has an arm 38 thereon connected by pin and slot means to the shaft 29, and the pivot pin 37 has an arm 39 thereon connected by pin and slot means to an arm 40 of a bell-crank lever 41 which has its angle portion pivoted by means 42 in the upper part 10' of the casing, and has its free end connected by pin and slot means to a lug 43 projecting from the upper part of valve stem 16.

Figure 2:
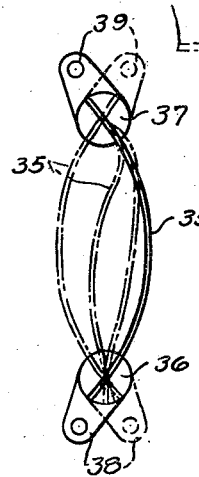
Fig. 2 is a detailed view of the cantilever spring included in this invention for opening the valve instantaneously when the critical differential pressure is reached.

The operation of this valve structure in relieving cabin pressure to the ambient atmosphere instantaneously at the moment when the critical differential pressure is reached is as follows:

As the flight and ascent with the plane is begun, the interior chamber 25 of the valve casing is brought to ambient atmospheric pressure by means of channel 22, channel 23, and the initial position of port 26 in the stem, thus conducting the surrounding atmosphere into the chamber. As the airplane continues to ascend, the increasing pressure differential, between cabin pressure outside the chamber and ambient atmospheric pressure inside the chamber, acts across the outside of diaphragm 27, being opposed by the action of spring 33, so as to cause progressive deformation of the arced cantilever spring 35. At the beginning of this movement the associated bell-crank lever 41 and the stem 16 and valve 13 remain in closed position, until the critical limit of the differential pressure is reached, whereupon this spring 35 will snap immediately into the position opposite its original position, as shown by dotted lines in Fig. 2, thereby actuating bell-crank lever 41 and will then draw valve stem 16 upward to instantaneously and fully open the valve 13, from the full line position to the dotted line position shown in Fig. 1.

This construction and arrangement of the valve opening mechanism thus functions to initially store or hold in abeyance the energy imparted by action of the differential pressure exerted across the diaphragm 27, and then at the critical point of the differential pressure acts rapidly to open the valve instantaneously and thus provide a large exit for promptly relieving excessive pressure to the atmosphere.

Means is provided herein for automatically resetting or closing the valve when it has been opened, and this means preferably comprises a pressure actuated mechanism which has a diaphragm 44 mounted across a pocket 45 and has its lower side subject to cabin pressure entering through an open port 46 on the pocket. A stem 47 in the form of a needle valve rises from this diaphragm and extends slidably through an airtight gasket 48, said stem having its upper end movable in a channel 49 in the casing which leads from an opening or port 50 providing a valve seat closeable by the end of stem 47. A spring 51 on stem 47 urges the stem and diaphragm to the valve-open position. Said channel 49 is brought in communication with port 26 in the valve stem when said valve stem has been moved to its upper or open position, as indicated by the upper dotted port 26 in Fig. 1.

The automatic resetting of the valve occurs as follows:

The increased cabin pressure admitted through port 46 into pocket 45 acts across one side of diaphragm 44, against the action of ambient atmospheric pressure and the tension of spring 51 upon the opposite side of the diaphragm, to bring needle valve 47 to its closed position and close port 50, at a differential pressure chosen as the reset value, a differential smaller than that required to actuate the valve assembly and open valve 13. Thus, as port 26 in stem 16 moves up into communication with channel 49, by the opening movement of the stem and valve, no cabin air can enter said channel 49, as needle valve 47 closes valve port 50, and the interior chamber 25 of the valve remains at ambient atmospheric pressure. Any slight reduction in cabin pressure does not result in sufficient reverse movement of diaphragm 27 to reverse the position of cantilever spring 35 so as to close the valve assembly. As the cabin pressure is then relieved, and the differential pressure acting across diaphragm 44 of the resetting valve falls below the selected reset value, such as 13 inches of mercury, the needle valve 47 is opened by action of spring 51, thereupon admitting cabin pressure through port 50, channel 49, and port 26 to the interior chamber 25. The pressure acting across the two opposite sides of the diaphragm 27 is now cabin pressure and is thus neutralized, and by the action of spring 33 the cantilever spring 35 will be returned to its initial position, whereby the outlet valve assembly will be actuated to close the valve 13. With the return of the valve stem 16 its port 26 is returned into alignment with channel 23 and the cabin air pressure is again cut off from interior chamber 25 and said chamber is then promptly returned to ambient atmospheric pressure. The automatic resetting of the relief valve is thus completed.

A manual control or over-ride mechanism is also provided, and it preferably comprises a lever 52 pivoted on an ear 53 on the cap 33, and having its lower end connected by pin and slot means to the outer end 54 of shaft 29. Hereby, the lever can be promptly operated manually to actuate the mechanism for opening the valve and likewise for closing the valve, whenever desired.

Locking means has also been provided herein for locking the lever and thereby the valve in either the open position or the closed position, and this is preferably provided by a locking bar 55 turnably mounted in a bracket arm 56 provided on the casing, and having an arm 57 which is movable against the lever so as to hold it in either its open or its closed position, as best shown in Fig. 4. The bar 55 has a pair of dents 58 on its inner part and has a spring 59 provided to hold the dents 58 frictionally in position in grooves provided in bracket arm 56 so as to retain the locking bar in the position in which it is set.

I claim:

1. A relief valve mechanism for a pressure cabin, comprising a casing including a valve exposed on one side to external atmospheric pressure and on the opposite side to cabin pressure and automatically opened for admitting external pressure into the cabin when it exceeds the cabin pressure, means for transmitting atmospheric pressure to the inside of the casing and also duct means for transmitting cabin pressure into said casing, pressure responsive means subject on one side to cabin pressure and on the other side to pressure within the casing and being operably connected with the valve and automatically operated to open the valve when a selected differential of cabin pressure over external pressure is exceeded, and resetting means for closing said valve including a normally closed valve in said duct means and also diaphragm means subjected to cabin pressure on one side and to atmospheric pressure on the other side to open said resetting valve under certain pressure conditions and transmit cabin pressure into the casing to act on the said other side of the pressure responsive means and effect its retraction to reset the first mentioned valve.

2. An auxiliary relief valve for a pressure cabin, comprising a unitary assembly including a valve and means which carries the valve and affords movement to the valve relative to said means, the valve being subject on one side to cabin pressure tending to hold it closed and on the other side to external atmospheric pressure tending to open it and being moved relative to the carrying means in the assembly and automatically opened to admit the atmospheric pressure to the cabin when said external pressure exceeds the cabin pressure, pressure responsive means connected with said carrying means and subject on one side to atmospheric pressure tending to close the valve and on the other side to cabin pressure tending to open the valve and together with said carrying means and valve providing the unitary assembly, and pressure responsive means associated with said carrying means and being under the opposing influence of cabin pressure and of external atmospheric pressure, whereby the assembly is operated and the valve is opened automatically when cabin pressure exceeds external pressure beyond a selected differential.

3. An auxiliary relief valve for a pressure cabin, comprising a unitary mechanism including a valve under influence of external atmospheric pressure and provided with a stem, the valve being movable on the stem and automatically opened to admit external atmospheric pressure to the cabin when the external pressure exceeds the cabin pressure, pressure responsive means carried by the stem and with it and said valve providing an assembly balanced under the opposing influence of external pressure and of cabin pressure, and pressure responsive means and means operably connecting the same with the stem and including snap-action means for automatically actuating the assembly to open the valve instantaneously and relieve the pressure from the cabin when a selected differential pressure between cabin pressure and external pressure has been exceeded.

4. An auxiliary relief valve for a pressure cabin, comprising a unitary mechanism including a casing having a lower compartment containing a valve provided with a stem, said valve being movable on the stem and automatically openable to admit ambient atmospheric pressure into the compartment and therefrom to the cabin when said pressure exceeds the internal cabin pressure, a diaphragm carried by the stem mounted across the compartment, which with said valve and stem is held balanced by the opposing action of ambient atmospheric pressure and internal cabin pressure and provides a balanced valve assembly, and pressure responsive means in the casing and means operably connecting it with the stem for automatically actuating the stem to open the valve and relieve the pressure from the cabin when a selected differential pressure between cabin pressure and external pressure has been exceeded.

5. An auxiliary relief valve for a pressure cabin, comprising a casing including a valve and means for supporting the valve to provide relative movement between said means and valve, said valve being under opposing influence of cabin pressure and of external atmospheric pressure and automatically opened to admit air into the cabin when the external pressure exceeds internal cabin pressure, pressure responsive means subject on one side to cabin pressure and on the other side to atmospheric pressure, means operably connecting the pressure responsive means with the valve supporting means to open the valve for relieving cabin pressure when it exceeds external pressure by a selected differential, an over-ride lever pivoted on the casing operably connected with said pressure responsive means for manually moving the valve to its open or to its closed position, and a locking bar mounted on the valve casing and being resiliently held and operable for locking said lever and thereby the valve in either its open or its closed position.

6. An auxiliary relief valve for a pressure cabin comprising a casing including a valve and means for supporting the valve to provide relative movement between said means and valve, said valve being under opposing influence of cabin pressure and of external atmospheric pressure and automatically moved relative to said supporting means and opened to admit air through the casing into the cabin when the external pressure exceeds internal cabin pressure, pressure responsive means mounted across an opening on the casing and being provided with a shaft and a release spring, means including a snap-action means operably connecting the shaft with the valve supporting means to open the valve instantaneously for relieving cabin pressure when it exceeds external pressure beyond a selected differential, and an over-ride member operably connected with said shaft for manually moving the valve to its open or to its closed position.

7. An auxiliary relief valve for a pressure cabin, comprising a unitary casing including a valve so mounted as to be under influence of external atmospheric pressure, a chamber in the casing and a channel normally admitting external air into the chamber, a stem on the valve being provided with a port which normally coincides with said channel, said stem being operable to open the valve and to close-off said port and said chamber from external air, means under cabin pressure and also under external air pressure and being actuated when the pressure differential becomes excessive, whereby to operate said stem for opening the valve and relieving the cabin pressure, and means under opposing influence of cabin pressure and external air pressure and actuated by variations between said pressures and automatically operable for resetting the valve when the excessive differential pressure is relieved.

8. The subject matter set forth in claim 7, and wherein the valve resetting means comprises a needle valve having pressure responsive means thereon which is under the opposing influence of the cabin pressure and of the chamber pressure, and a passage communicating with the chamber and with the interior of the cabin and being closed by the needle valve through excessive differential pressure on said last-mentioned pressure responsive means, but opened when said pressure is partially relieved, thereby admitting cabin pressure through said passage and the stem-port to the chamber for effecting the resetting of the valve.

9. An auxiliary relief valve for a pressure cabin, comprising a casing mounted in the cabin and containing a main valve under opposing influence of cabin pressure and of external atmospheric pressure, a chamber in the casing and a channel normally admitting external atmosphere to the chamber, a stem on the valve being provided with a port which in the valve-closed position coincides with said channel and is operable to open the valve and to close-off said port and channel from the external atmosphere, a pressure responsive member under the opposing influence of cabin pressure and of external atmospheric pressure in said chamber, and being actuated when the former exceeds the latter pressure beyond a selected differential, whereby to move the stem and to open the valve for relieving cabin pressure, a passage in the casing which communicates with the chamber through said port when the stem is in valve-open position, said passage having a valve seat normally open to cabin pressure, a needle valve adapted to close said seat and carrying pressure responsive means subject on one side to cabin pressure and on the opposite side to atmospheric pressure in said channel, whereby the needle valve will be closed through excessive differential pressure, but when said excessive pressure is partly relieved the needle valve will be opened, thus admitting cabin pressure through said passage and stem-port into the chamber, thereby actuating said member and the stem to close the main valve and complete the resetting operation.

10. An auxiliary relief valve for a pressure cabin, comprising a unitary casing having a main valve under influence of external atmospheric pressure, a chamber in the casing and a channel normally admitting external air to the chamber, a stem whereon said valve is mounted for movement relative thereto, the stem containing a port which normally provides a part of said air channel, said stem being operable to open the valve and close said port and channel, said valve being subject to cabin pressure on one side tending to hold it closed and to atmospheric pressure on the opposite side tending to open it and being automatically opened when the external air pressure exceeds the cabin pressure, pressure responsive means associated with said chamber and being normally opposingly under cabin pressure and under the external air pressure within said chamber and being operative when the air pressure differential is excessive, a snap spring actuated by the pressure responsive means and being operably connected with said stem, whereby to initially store the energy imparted by the pressure responsive means and at the critical differential pressure instantaneously open said valve to relieve the cabin pressure while closing off said port and the chamber from external air.

11. An auxiliary relief valve for a pressure cabin, consisting of a unitary structure comprising a casing having a valve subjected externally to ambient atmospheric pressure and internally to cabin pressure, a chamber in the casing and a channel admitting external atmosphere thereto, a stem which carries the valve but whereon it is movable and is automatically opened when external pressure rises above cabin pressure, to admit external atmospheric pressure to the chamber, flexible means on the chamber subject on one side to atmospheric pressure in the chamber and on the opposite side to cabin pressure, and an arced spring and a pair of pivot members in said chamber, each member holding one of the spring ends, one of said members being operably connected with said flexible means and the other with the stem, whereby the energy imparted by the action of the differential pressure on said flexible means is at first stored when the cabin pressure first rises above the selected differential pressure but when the differential pressure reaches the critical point will operate to open the valve instantaneously.

12. An auxiliary relief valve for a pressure cabin, consisting of a unitary structure comprising a casing including a valve seat mounted in the cabin wall and containing a valve subject inwardly to cabin pressure and externally to ambient atmospheric pressure, and being automatically opened to admit external pressure when it rises above cabin pressure, a chamber in the casing and a channel to admit external air to the chamber, a diaphragm mounted across an opening on the chamber to be subject on the chamber side to atmospheric pressure and on the opposite side to cabin pressure, means in said chamber interposed between and operably connected with said diaphragm and with the valve and including a snap spring whereby the energy and action of the differential pressure on said diaphragm is at first retained in abeyance, until at the critical point the spring action will instantaneously open the valve, and reset means including means controlling communication between the chamber and the cabin and provided with pressure responsive means under the opposing influence of cabin pressure and of atmospheric pressure in said chamber and actuated by variations between said pressures, whereby the valve mechanism is reset when the pressure differential has dropped from excess to normal.

13. The subject matter set forth in claim 12 and further provided with over-ride means operably connected with the diaphragm and its valve-connecting means, whereby to operate the valve manually at will.

14. An auxiliary relief valve for a pressure cabin, consisting of a unitary structure comprising a casing mounted in a cabin and containing a valve assembly including a valve movable in the assembly and subject inwardly to cabin pressure and externally to ambient atmospheric pressure, and being automatically opened in the assembly to admit atmospheric pressure when it rises above cabin pressure, a chamber in the casing and a channel to admit atmospheric pressure to the chamber, a member mounted on the chamber and under opposing influence of atmospheric pressure and of cabin pressure, means operably connected with said member and with the valve assembly and including a spring, whereby the energy imparted by the action of the differential pressure on said member is initially stored until at the critical point the action of the spring will instantaneously open the valve, a needle valve controlling a port providing communication between the chamber and the cabin and having pressure responsive means thereon under the opposing influence of cabin pressure and of atmospheric pressure in the chamber and being actuated by variations between said pressures to open said needle valve for admitting cabin pressure to said chamber, whereby the first mentioned valve is reset when the pressure differential has dropped from excess to normal, and over-ride means connected with said member whereby to operate the valve assembly manually at will.

ROBERT J. SCHROEDER.